(12) United States Patent
Conklin, Jr. et al.

(10) Patent No.: US 6,698,577 B1
(45) Date of Patent: Mar. 2, 2004

(54) BAGGAGE CAROUSEL ADVERTISING DISPLAY PANELS AND SYSTEM

(76) Inventors: Dennis Conklin, Jr., 11326 E Mimosa Dr., Scottsdale, AZ (US) 85255; Randall W. Wojtysiak, 1418 E. Catamaran Dr., Gilbert, AZ (US) 85234

( * ) Notice: Subject to any disclaimer, the term of this patent is extended or adjusted under 35 U.S.C. 154(b) by 0 days.

(21) Appl. No.: 10/199,753

(22) Filed: Jul. 19, 2002

(51) Int. Cl.[7] .............................................. B65G 43/00
(52) U.S. Cl. ................................ 198/502.1; 198/822
(58) Field of Search ........................... 198/502.1, 822; 40/472, 524, 124.191, 675

(56) References Cited

U.S. PATENT DOCUMENTS

| | | | |
|---|---|---|---|
| 4,090,464 A | * | 5/1978 | Bishopp et al. ............... 40/594 |
| 4,979,591 A | * | 12/1990 | Habegger et al. ........ 198/502.1 |
| 5,165,526 A | | 11/1992 | Conklin |
| 5,244,080 A | * | 9/1993 | Bierbaum ................ 198/502.1 |
| 5,280,831 A | | 1/1994 | Conklin |
| 5,311,980 A | * | 5/1994 | Munkner et al. ......... 198/502.1 |
| 5,330,044 A | | 7/1994 | Conklin |
| 5,427,227 A | * | 6/1995 | Crandall et al. .......... 198/502.1 |
| 5,592,698 A | * | 1/1997 | Woods ......................... 2/434 |
| 6,044,961 A | * | 4/2000 | Hine ....................... 198/502.1 |
| 6,186,314 B1 | | 2/2001 | Conklin |
| 6,461,709 B1 | * | 10/2002 | Janssen et al. ................ 40/615 |

* cited by examiner

*Primary Examiner*—Douglas Hess
(74) *Attorney, Agent, or Firm*—Parsons & Goltry; Robert A. Parsons; Michael W. Goltry

(57) ABSTRACT

A baggage carousel including an attachment member movable about a continuous circuit and a conveyor panel coupled to the attachment member. The conveyor panel includes a base plate, an indicia plate, and a bumper layer carried therebetween. The base plate has an upper surface with a recess formed therein. The indicia plate includes a protective cover overlying an indicia sheet, and is carried in the recess of the base plate.

13 Claims, 3 Drawing Sheets

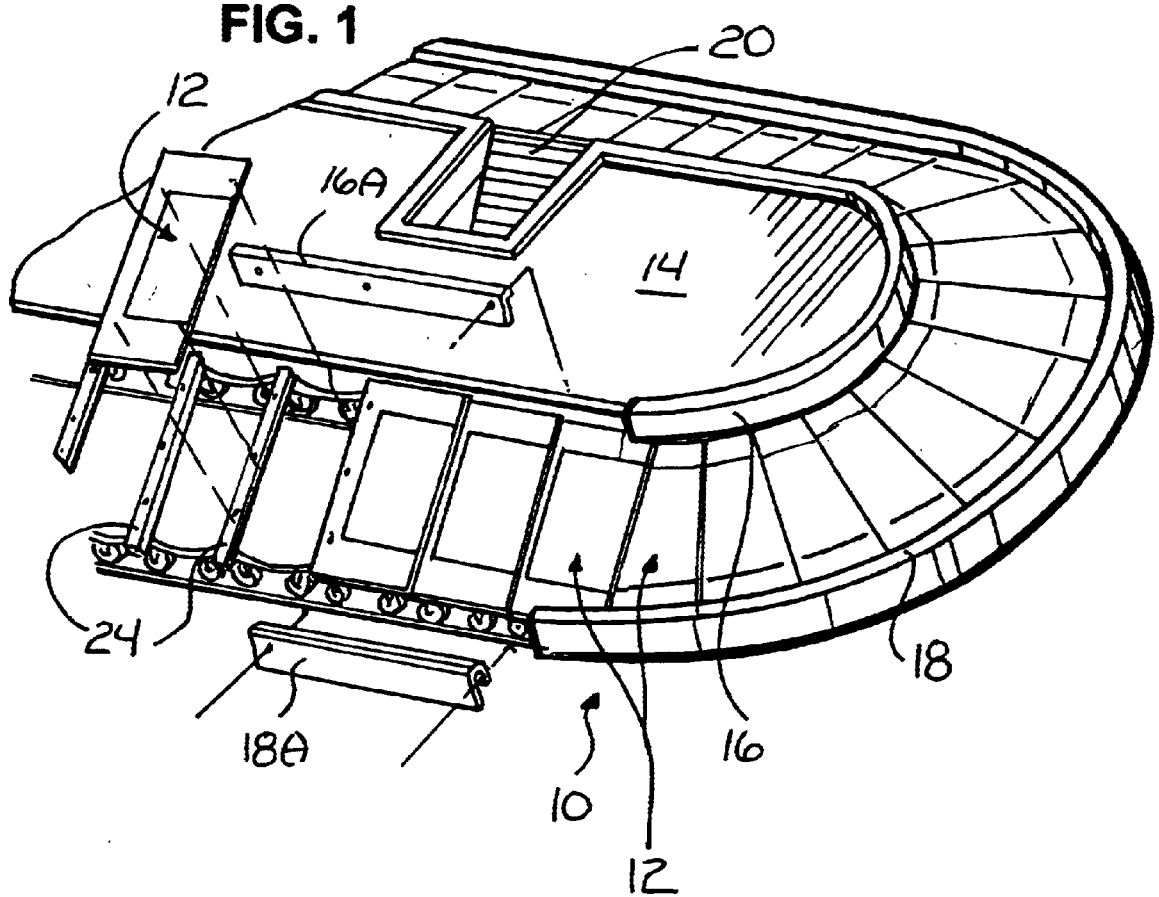

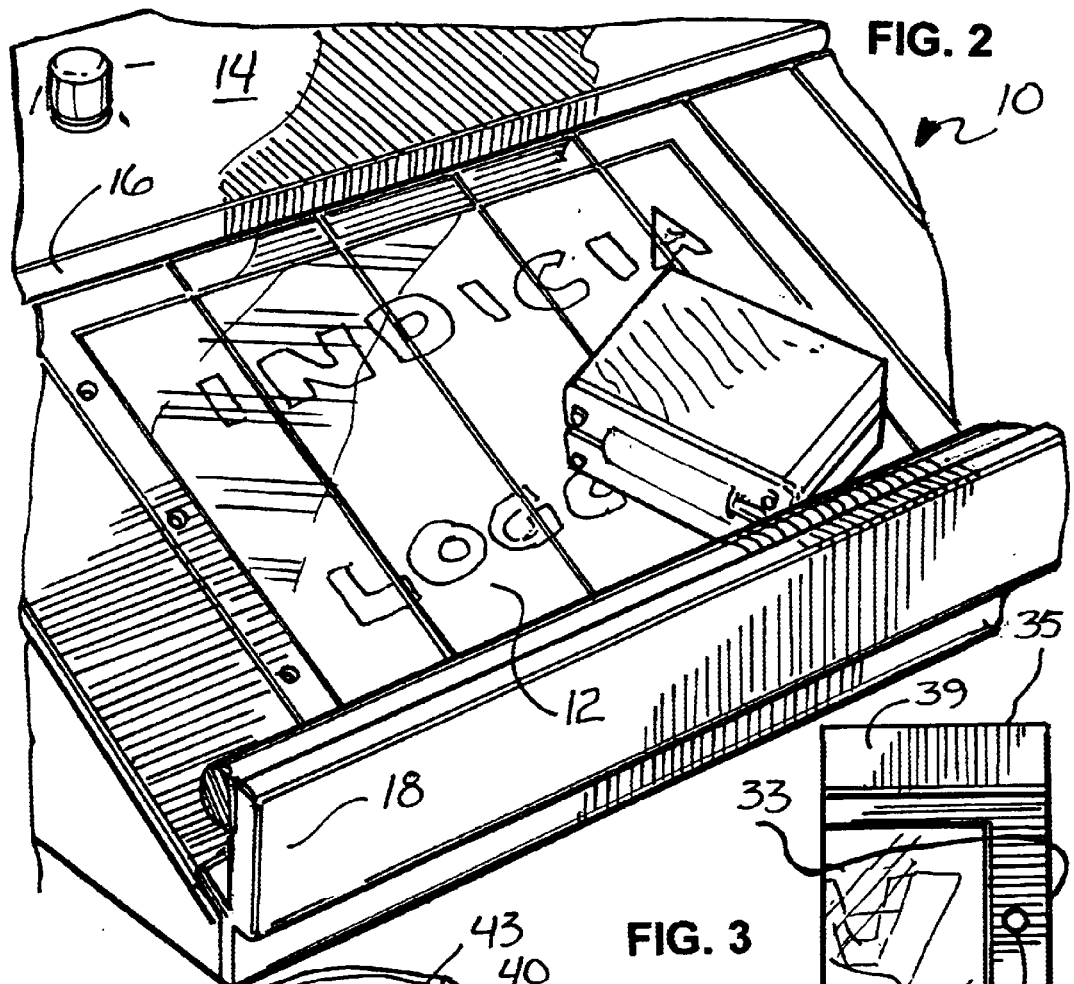
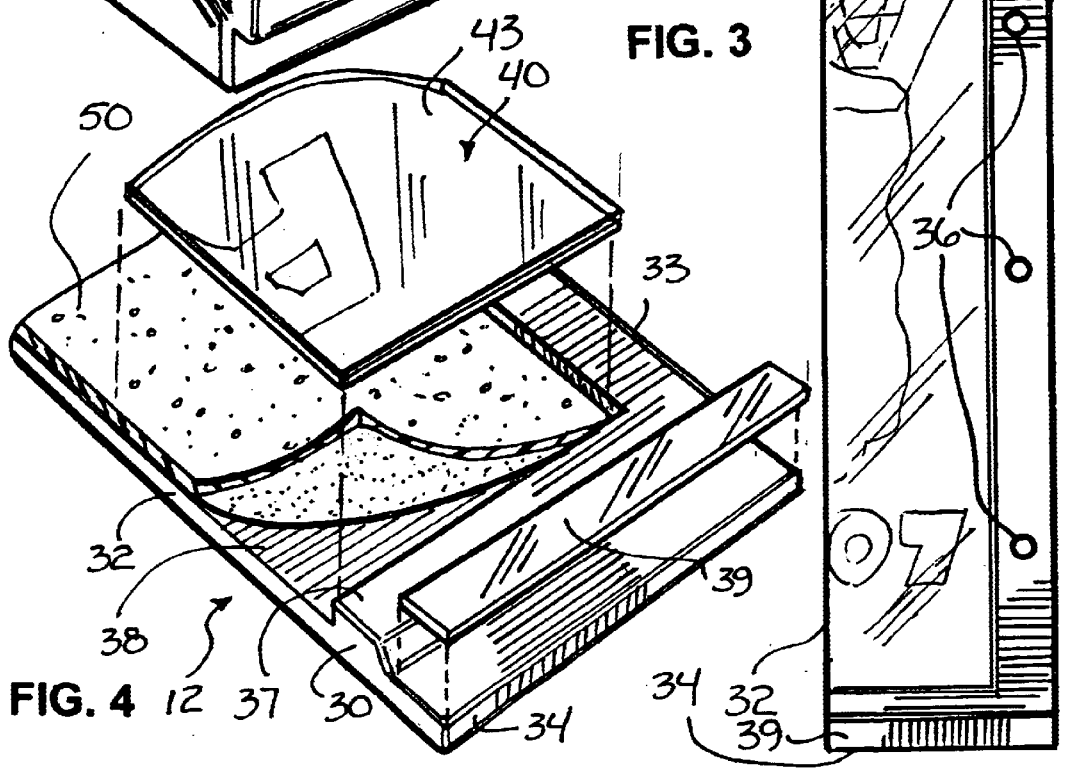

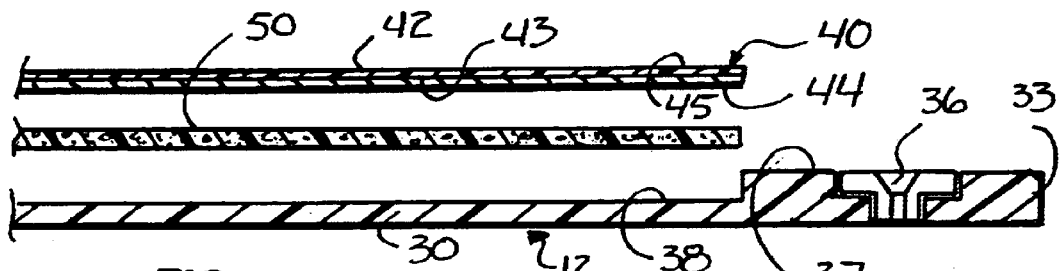
FIG. 5
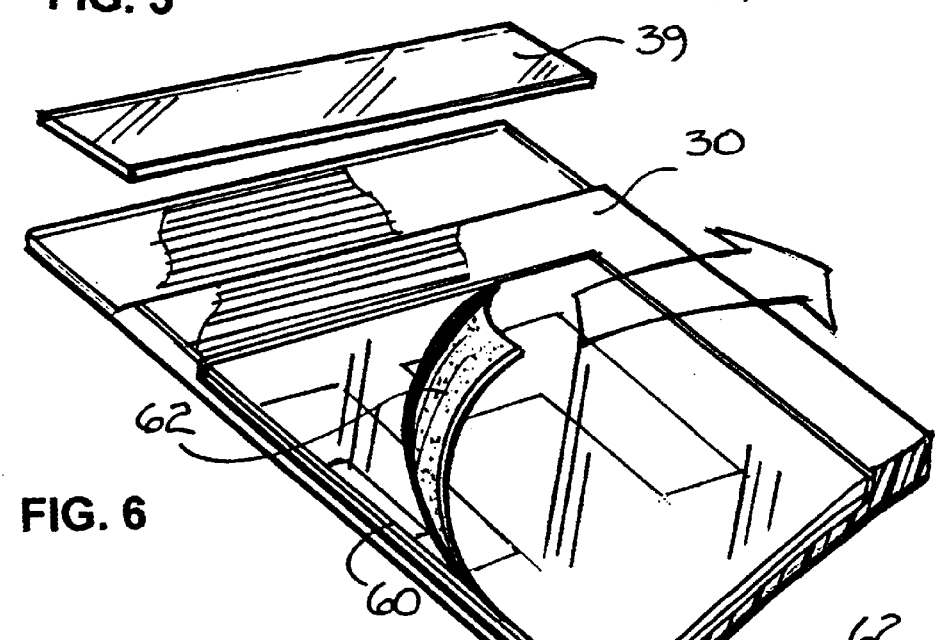
FIG. 6
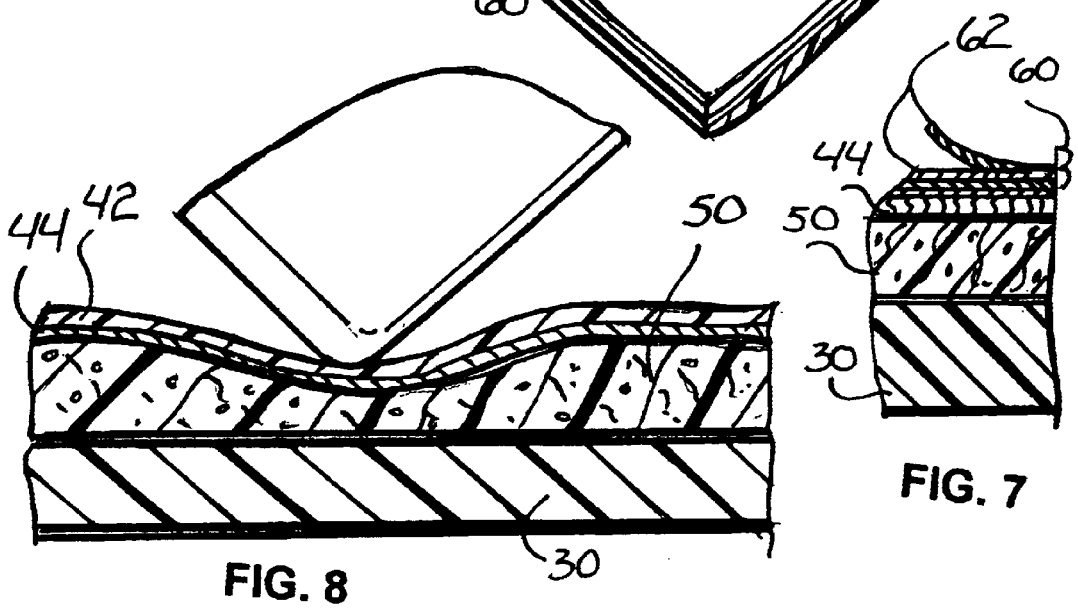
FIG. 7
FIG. 8

BAGGAGE CAROUSEL ADVERTISING DISPLAY PANELS AND SYSTEM

FIELD OF THE INVENTION

This invention relates to methods and devices for advertising.

More particularly, the present invention relates to visual information such as advertising on endless conveyors.

In a further and more specific aspect, the instant invention concerns panels having visual information forming the load carrying platforms on baggage carousels.

BACKGROUND OF THE INVENTION

Conveyors for carrying items from one location to another location are well known in the art. In a specific example, conveyors are placed into an endless essentially circular orientation for dispensing baggage at airports. Recently, panels have been developed for carrying and presenting advertising to passengers waiting for their baggage. Notable among these devices is a sheet containing advertising adhered to the top surface of the conveyor panels. While presenting advertising to waiting passengers, this method is relatively ineffectual as the baggage and items carried by the carousel damage the sheets, obscuring the advertising.

A much more effective approach has been adhering sheets containing indicia to the bottom of a transparent panel. In this manner the relatively fragile sheet containing indicia is protected from the baggage and items carried by the carousel. While very effective, this method has a drawback of being relatively expensive and also will become scratched and worn over time by the repeated contact with baggage.

In both of the foregoing devices, sheets containing the indicia are adhered to the carousel panels. Thus when the sheets and indicia are damaged or when new indicia are desired, the entire panel must be replaced. Replacement of the panels on a baggage carousel is labor-intensive as well as costly.

More recent panels include indicia sheets coupled to the back of transparent protective cover which are in turn fastened to the top of base panels. These panels allow for indicia to be changed without replacing the base panel. However, baggage entering onto the carousel is often dropped from a feed conveyor. This drop, while not exceptionally large, does tend to cause baggage and other items to gouge and scratch the protective covers. After a relatively short time, the panels can become unattractive or the indicia obscured.

It would be highly advantageous, therefore, to remedy the foregoing and other deficiencies inherent in the prior art.

Accordingly, it is an object of the present invention to provide a new and improved baggage carousel.

Another object of the invention is to provide a conveyor panel with easily replaceable indicia.

And another object of the invention is to provide a conveyor panel which will absorb the shock of baggage dropped thereon.

Yet another object of the present invention is to provide an advertising device which is highly visible and durable.

And yet another object of the present invention is to provide a new and improved method for making, using and maintaining an advertising device for use on conveyor systems, which is relatively inexpensive, and produces highly visible and durable advertising devices.

Still another object of the present invention is to provide a panel which can be used with conveyors, a plurality of which may be used on each conveyor, and which can be individually replaced are changed to change visual information without replacing the panel.

SUMMARY OF THE INVENTION

Briefly, to achieve the desired objects of the instant invention in accordance with a preferred embodiment thereof, provided is a conveyor panel including a base plate having an upper surface, the upper surface having a recess formed therein, and an indicia plate including a protective cover overlying an indicia sheet. The indicia plate is carried in the recess of the indicia plate, and a bumper layer is carried in the recess between the base plate and the indicia plate. In a specific aspect, the protective cover includes a plurality of cover sheets, each peelably removable from the other.

Another aspect of the present invention provides a baggage carousel having an attachment member movable about a continuous circuit, and a conveyor panel as described above coupled to the attachment member.

Also provided is a method of displaying indicia on a baggage carousel.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a partial perspective view of a baggage carousel according to the present invention;

FIG. 2 is an enlarged perspective view of a portion of the baggage carousel of FIG. 1;

FIG. 3 is a top plan view of a conveyor panel according to the present invention;

FIG. 4 is a partial exploded perspective view of a top portion of the conveyor panel of FIG. 3;

FIG. 5 is a partial cross-sectional view of the conveyor panel of FIG. 4;

FIG. 6 is a partially exploded perspective view of a bottom portion of the conveyor panel;

FIG. 7 is a partial sectional side view of the conveyor panel of FIG. 6; and

FIG. 8 is a sectional side view of the conveyor panel of FIGS. 6 and 7, as it would appear impacted by a piece of baggage.

DETAILED DESCRIPTION OF THE PREFERRED EMBODIMENT

Turning now to the drawings in which like reference characters indicate corresponding elements throughout the several views, attention is first directed to FIGS. 1 and 2, which illustrate a baggage carousel generally designated 10. While the present invention may be used with endless conveyors in general, it is especially useful for improving baggage carousels well known in airports. Baggage carousel 10 includes a plurality of conveyor panels 12 that move around the periphery of carousel 10 carrying baggage and other items to waiting people. Panels 12 are upstanding between an elevated platform 14 with an upper rail 16 around its periphery and a lower rail 18 around the periphery of the entire carousel. A section is removed from elevated platform 14 for baggage loading means such as a belt conveyor 20. Belt conveyor 20 carries the baggage from a baggage loading area, generally placed at a lower level. Belt conveyor 20 carries the baggage up to the height of elevated platform 14 to slide the baggage onto conveyor panels 12. Since conveyor panels 12 are at an inclined angle, the baggage slides down conveyor panels 12 from the level of upper rail 16 to the level of lower rail 18.

Referring specifically to FIG. 1, an exploded section of carousel 10 is illustrated, showing individual conveyor panels 12 and a section of a transport mechanism that moves panels 12 around the circumference of carousel 10. An upper rail section 16A is shown removed from the remaining portion of upper rail 16. Likewise, a lower rail section 18A is removed from the remaining section of lower rail 18 located around the periphery of carousel 10. This permits panels 12 to be removed from the transport system itself. Conveyor panels 12 are fastened with screws, for instance, to a plurality of spaced apart attachment members, in this embodiment support bars 24. Each support bar 24 is interconnected with adjacent support bars forming a continuous circuit. The structure of the baggage carousel will not be described in greater detail as it is well known to those skilled in the art. One skilled in the art will understand that other types of baggage carousels and conveyors can employ the present invention, such as flat baggage carousels and the like.

Referring now to FIGS. 3, 4, and 5, conveyor panel 12 includes a base plate 30 having a leading edge 32, a trailing edge 33, a top edge 34, a bottom edge 35, and a top surface 37. A recess 38 is formed in top surface 37 intermediate top edge 34 and bottom edge 35, and extending from leading edge 32 to a point spaced from trailing edge 33. A plurality of apertures 36 are formed along trailing edge 33 intermediate trailing edge 33 and recess 38. Apertures 36 receive fasteners for fastening conveyor panel 12 to support bars 24. Recess 38 can be routed in base plate 30 or molded therein during fabrication of base plate 30. One skilled in the art will understand that while recess 38 is employed in the present embodiment, the top surface of the panel may be generally planar, without a recess, or simply with a raised trailing edge for attachment of the panel to the carousel.

Wear strips 39 can be fastened to the top and bottom of base plate 30 as can be seen in FIGS. 3, 4 and 6, by any of a variety of fastening mechanism, such as fasteners like screws, pins clips, etc and adhesives, which are preferred for this embodiment. Wear strips 39 serve to add additional protection where base plate 30 slides under rails 16 and 18. When a wear strip is employed, base plate 30 can have recesses formed at the top and bottom thereof to receive the wear strip. One skilled in the art will readily understand that other types of carousels may not have one or more of rails 16 and 18. In those instances, one or both of wear strips 39 may not be employed. When wear strips 39 are absent, recess 38 can extend the entire length of base plate 30, from top edge 34 to bottom edge 35. Base plate 30 is preferably formed in a single (unitary) piece, of a synthetic material such as plastic, or other hard material. The preferred material is a hybrid ABS like ROYAL LIGHT KYDEX® or the like. The use of some materials may permit the elimination of wear strips 39.

Conveyor panel 12 further includes an indicia plate 40 mounted within recess 38 of base plate 30. Indicia plate 40 consists of a protective cover 42 having a back surface 43 and an indicia sheet 44 adhered to back surface 43. A front surface 45 of indicia sheet 44 is adhered to back surface 43 so that the indicia is viewable through protective cover 42.

In the preferred embodiment, protective cover 42 is transparent, permitting indicia on indicia sheet 44 to be viewed therethrough. It will be understood that while indicia sheet 44 is an actual sheet of material in this embodiment, a "sheet" of ink can be printed directly onto the back side of protective cover 42. It will also be understood that the term transparent can means translucent, tinted, etc., as long as the indicia can be viewed. Protective cover 42 is preferably fabricated of a hard coat plastic such a hard coat polycarbonate (LEXAN®), which is lubricious, facilitating sliding movement between panels, and hard, retarding gouging and scratching.

Still referring to FIGS. 3, 4, and 5, a bumper layer 50 is positioned between indicia plate 40 and base plate 30. Bumper layer 50 is preferably a sheet of rubber or other elastomeric material fastened to base plate 30 within recess 38. During fabrication of panel 12, bumper layer 50 is fastened, such as by mechanical fasteners or adhesives, within recess 38, with a subsequent step of fastening indicia plate 40 to bumper layer 50. Alternatively, bumper layer 50 can be fastened to indicia plate 40 initially, with a subsequent step of fastening bumper layer 50 to base plate 30. As stated, the fastening of the various layers and sheets is preferably accomplished through the use of adhesives, although mechanical fasteners such as screws, pin, clips, etc, can be employed. Bumper layer 50 absorbs the force of impact created when a piece of baggage or other item is dropped onto carousel 10 as can be seen with reference to FIG. 8. When an item contacts protective cover 42, instead of being held rigid and being gouged, bumper layer 50 allows cover 42 to give slightly, diffusing the impact and greatly reducing the likelihood of gouging or scratching.

When installed on baggage carousel 10, conveyor panels 12 overlap adjacent panels 12 as illustrated in FIGS. 1 and 2. Leading edges 32 of the overlapping panels cover a portion of trailing edges 33 of the panels to a point adjacent indicia plate 40. This presents a substantially unbroken view of indicia sheets 44 of adjacent panels, at least on the straight stretches of the baggage carousel. It will be understood that the direction of overlap depends on the direction of rotation of the carousel, and carousels have been developed for rotation in both direction. The overlap of panels 12 conventionally results in wear on the top surface of adjacent conveyor plates. However, wear on indicia plate 40 is substantial reduced or eliminated in this embodiment because the top surface thereof can be recessed with respect to top surface 37 of base plate 30 allowing adjacent panels to slide over the top without making substantial contact.

Thus, panels 12 are installed on baggage carousel 10, as illustrated in FIG. 1, to form one or more single panel or compound panel images, as desired for advertising, etc. Changing the indicia employed is easily accomplished by removing the desired indicia plate 40, and substituting therefore another indicia plate containing the new indicia. During this entire procedure, base plate 30 can remain in position, attached to baggage carousel 10.

Turning now to FIGS. 6 and 7, another embodiment of a protective cover, generally designated 60, is illustrated. Cover 60 functions in the same manner as described previously for protective cover 42 and the remaining elements will be designated as previously. The difference is the addition of multiple layers. Protective cover 42 can preferably be a single layer having a thickness of between 10 mils and 60 mils due to the action of bumper layer 50. Since an effective protective cover can be so thin, in this embodiment, cover 60 includes a plurality of cover sheets 62 fastened together, with the bottom most sheet fastened to indicia sheet 44. Over time, the top most cover sheet of protective cover 60 may become worn, scratched, dirty, etc. Instead of replacing cover 60 or panel 12, the top most sheet is simply peeled off as illustrated in FIG. 6. The underlying cover sheet is unmarred and cover 60 appears as new. A peelable adhesive is preferably used to fasten plurality of cover sheets 62 together.

Cover 60 can be formed of plurality of cover sheets 62 because sheets 62 can be sufficiently thin, preferably between 0.010 and 0.060 inches. Thus, cover 60 can be a single sheet of between 10 mil and 60 mils. A very thin protective cover can be employed due to the absorbing and dissipating action of bumper layer 50, which is also preferably 6 mils in thickness.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A baggage carousel comprising:
    an attachment member movable about a continuous circuit; and
    a conveyor panel coupled to the attachment member, the conveyor panel including:
        a base plate having an upper surface, the upper surface having a recess formed therein;
        an indicia plate including a protective cover overlying an indicia sheet;
        the indicia plate carried in the recess of the base plate; and
        a bumper layer formed of an elastomeric material carried in the recess between the base plate and the indicia plate, whereby the bumper layer cushions the indicia plate and absorbs impact forces thereon.

2. A baggage carousel as claimed in claim 1 wherein the protective cover includes a plurality of cover sheets, each peelably removable from the other.

3. A baggage carousel as claimed in claim 1 wherein the protective cover is transparent.

4. A baggage carousel as claimed in claim 1 wherein the indicia plate extends from a leading edge of the base plate to a point spaced from a trailing edge of the base plate.

5. A baggage carousel as claimed in claim 4 wherein a top surface of the indicia plate is inset from the top surface of the base plate.

6. A baggage carousel as claimed in claim 1 wherein the indicia plate extends from a top edge of the base plate to a bottom edge of the base plate.

7. A baggage carousel as claimed in claim 1 wherein the bumper layer is a sheet of elastomeric material fastened to a surface of the recess and a back surface of the indicia plate.

8. A baggage carousel as claimed in claim 1 further including wear strips coupled to an upper edge and a lower edge of the base plate.

9. A method of displaying indica on a baggage carousel comprising the steps of:
    providing a baggage carousel having a plurality of attachment members;
    providing a plurality of conveyor panels, each panel including a base plate having an upper surface, the upper surface having a recess formed therein, an indicia plate including a protective cover overlying an indicia sheet, the indicia plate carried in the recess of the base plate, a bumper layer formed of an elastomeric material carried in the recess between the base plate and the indicia plate, whereby the bumper layer cushions the indicia plate and absorbs impact forces thereon; and
    coupling each of plurality of conveyor panels to a different one of the plurality of attachment members.

10. The method as claimed in claim 9 wherein the step of providing further includes providing a protective cover including a plurality of cover sheets, each peelably removable from the other, and upon a top most cover sheet becoming worn, peeling the top most cover sheet from an underlying cover sheet.

11. A method as claimed in claim 9 wherein the step of providing further includes the steps of:
    adhering the bumper layer to a back surface of the indicia plate; and
    adhering the bumper layer to the base plate within the recess.

12. A method as claimed in claim 9 wherein the step of providing further includes the steps of:
    adhering the bumper layer to the base plate within the recess; and
    adhering a back surface of the indicia plate to the bumper layer.

13. The method as claimed in claim 9 further including replacing the indicia plate by removing the indicia plate from the recess and placing another indicia plate in the recess.

* * * * *